United States Patent
Kawakami

(10) Patent No.: US 6,236,663 B1
(45) Date of Patent: May 22, 2001

(54) INFORMATION REPRODUCTION APPARATUS AND INFORMATION REPRODUCTION METHOD

(75) Inventor: Satoshi Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/040,952

(22) Filed: Mar. 18, 1998

(30) Foreign Application Priority Data

Mar. 27, 1997 (JP) .................................................. 9-076073

(51) Int. Cl.⁷ ......................................................... H04J 3/14
(52) U.S. Cl. ............................................. 370/470; 345/507
(58) Field of Search .................................... 370/368, 470, 370/471, 472, 473, 474, 476, 229; 348/384; 345/507, 204, 185, 201, 202, 203, 515; 700/46; 707/1, 2; 711/100, 171, 172; 709/247

(56) References Cited

U.S. PATENT DOCUMENTS 5,577,190 * 11/1996 Peters .
5,854,640 * 12/1998 North et al. ......................... 345/515

* cited by examiner

*Primary Examiner*—Huy D. Vu
(74) *Attorney, Agent, or Firm*—Philip M. Shaw, Jr.

(57) ABSTRACT

An information reproduction apparatus for performing special reproducing operations including fast forward and fast reverse operations on an audio-video material. The information reproducing apparatus is capable of reading and reproducing information having a plurality of clips wherein the size of the recording medium access unit or cluster is set at a common multiple of the size of the recording medium minimum accessible unit or sector and the size of the minimum process unit or decoding packet size in the information material reproducing apparatus.

16 Claims, 9 Drawing Sheets

STRUCTURE OF TRANSPORT STREAM
PACKET (TS PACKET)

STRUCTURE OF PROGRAM STREAM
PACKET (PS PACKET)

INFORMATION REPRODUCTION APPARATUS AND INFORMATION REPRODUCTION METHOD

BACKGROUND OF THE INVENTION

1. Technical Field of the Invention

The present invention relates to an information reproduction apparatus and an information reproduction method for reading out and reproducing information material having a plurality of clips.

2. Description of the Related Art

In recent years, the techniques of compression-coding image information and audio information with minimum deterioration and then decoding the compressed-coded information material with a reproducing means have been developed. For example, the MPEG (Motion Picture Experts Group) system standard has been proposed as a scheme for compression-coding and then decoding (expanding) image information and audio information. An audio-video material or the like that has been compressed and multiplexed according to the MPEG system standard consists of a plurality of clips as shown in FIG. 10. Each clip consists of a plurality of clusters, four clusters in the example of FIG. 10. A "cluster" is a unit that is an integral multiple of a unit (for instance, 512 bytes) that is formed on a hard disk and generally called a sector. The example of FIG. 10 shows two clips, i.e., a certain clip CP2 and a preceding clip CP1.

In the conventional example of FIG. 10, information material (MPEG stream) 2 having clips CP1, CP2, etc. is recorded on a hard disk (HDD) 1. The information material 2 recorded on the hard disk 1 is to be decoded by a decoder. However, direct access to the information material 2 cannot be effected between the hard disk 1 and the decoder 2. This is because the MPEG stream is recorded on the hard disk 1 so as to be divided into certain units (for example, 4-byte units; hereinafter referred to as cells 1a) and a DMA buffer 3 needs to be used as a buffer for absorbing a size difference between the cell 1a of the hard disk 1 and the cluster CT. That is, in accessing the hard disk 1, the information material 2 needs to be temporarily stored in a buffer 3A or a buffer 3B.

To decode the clusters of the clips CP1 and CP2, for instance, by sending them to decoders 4a and 4b consecutively, a switcher 5 is used as shown in FIG. 10. The first cluster CT1 of the preceding CP1 is stored in the buffer 3A and reproduced by a decoder 4a, and the next cluster CT2 is stored in the buffer 3B and decoded by the decoder 4b. The switcher 5 sequentially outputs the clusters CT as a video signal, an audio signal, or the like by switching between the decoders 4a and 4b. As the switcher 5 switches between the decoders 4a and 4b, the clusters CT of the preceding clip CP1 and the clusters CT of the (ensuing) clip CP2 are reproduced consecutively.

When a user reproduces and uses audio-video material with a VTR or the like, he may want to start reproduction of a clip of the audio-video material from a certain position thereof as well as from its beginning. For this purpose, equipment such as a VTR is generally provided with such functions as FF (fast forward) and REW (fast reverse).

With equipment such as a VTR, when a user uses a system for decoding (reproducing) an audio-video material that has been coded according to the MPEG system scheme, he may want to start reproduction of a clip of a decoded audio-video material from a certain position thereof This operation can be realized by the following two methods:

Method A: Encoding a clip so that certain codes to serve as "markers" are inserted everywhere in the clip, and supporting a function that enables reading a clip of data to be started from a desired marker position in reproducing the clip.

Method B: Calculating a reproduction start position based on the compression rate of a clip and a desired time point (position). According to this scheme, for example, if the compression rate is 10 Mbps and it is desired to start reproduction from a time point 120 seconds after the present time, reproduction may be started from a position 1,200 Mbits downstream of the present position.

The above-described method A is employed in the DVD (digital versatile disc) etc. Although this method has the advantage that reproduction can be started precisely from a desired position, a function for handling "markers" is necessary, resulting in the disadvantage that the system configuration becomes more complex.

On the other hand, method B has the advantage that the system remains simple because it can be implemented easily, though it has the disadvantage that reproduction can be started only from an approximate position. However, there are a considerable number of uses in which reproduction need not always be started from a precisely determined position, that is, an accuracy of about several seconds is allowable. An example of such uses is the case that a user wants to reproduce a clip again from a somewhat upstream position. Method B is most appropriate for such common uses.

However, in method B, if reproduction is started from an arbitrary position, that is, if no limitation is imposed on the reproduction start position, there may occur a case that reproduction (i.e., an operation in which a clip of a coded audio-video material is supplied to a decoder and decoded there) is started from a certain position of a minimum unit called a "packet" that is prescribed by the MPEG2 system standard. In this case, the decoder may not be able to process the data correctly.

An object of the present invention is therefore to solve the above problems of method B and to thereby provide an information reproduction apparatus and an information reproduction method which can perform special reproducing operations such as fast forward and fast reverse on an audio-video material in a precise manner.

SUMMARY OF THE INVENTION

According to the invention, the above object is attained by an information reproduction apparatus for reading out and reproducing information material having a plurality of clips, comprising recording media on which the information material is recorded in minimum accessible units, information material storing means, including temporary buffer means, for reading out from the recording media, upon request and in sequence, a first clip and a second clip of the information material that each consist of a plurality of recording media access units, and writing the readout clips to the temporary buffer means, information material reproducing means for reproducing in process units the first clip from the temporary buffer means at the same time that the second clip is being written in the temporary buffer means by the information material storing means, and wherein a size of the recording media access unit is set at a common multiple of a size of the recording media minimum accessible unit and a size of a minimum process unit in the information material reproducing means.

In the preferred embodiment, the information material of the recording media is audio-video information that has been compression-coded, and the information material reproducing means decodes the information material. The recording media are preferably magnetic or magneto-optical disks and the size of the recording media minimum accessible unit is a sector size and the minimum process unit in the information material reproducing means is a packet size. The minimum process unit in the information material reproducing means is either a transport stream packet of, for example, 188 bytes, or a program stream packet of, for example, 2,048 bytes. The recording media access unit is a cluster size of, for example, 128 packets or 384 packets.

The object of the invention is also attained by an information reproduction method for reading out and reproducing information material having a plurality of clips, comprising the steps of recording the information material on recording media in minimum accessible units, reading out from the recording media, upon request and in sequence, a first clip and a second clip of the information material that each consist of a plurality of recording media access units, and writing the readout clips to a temporary buffer memory, reproducing, in process units, the first clip from the temporary buffer memory at the same time that the second clip is being written in the temporary buffer memory, and wherein in the reading out step, a size of the recording media access unit is set at a common multiple of a size of the recording media minimum accessible unit and a size of a minimum process unit.

With these settings, an arbitrary access unit (for instance, an arbitrary cluster) of a plurality of recording media access units necessarily starts from the head of a minimum process unit (for instance, a packet) in the information material reproducing means, whereby special reproducing operations such as fast forward and fast reverse can be performed reliably.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Preferred embodiments of the present invention will be hereinafter described in detail with reference to the accompanying drawings.

Since the following embodiments are preferred, specific examples of the invention include various limitations that are technically favorable. However, the scope of the invention is not limited to the embodiments unless there is a particular statement, in the following description, to the effect that the invention is limited.

Figure 1:
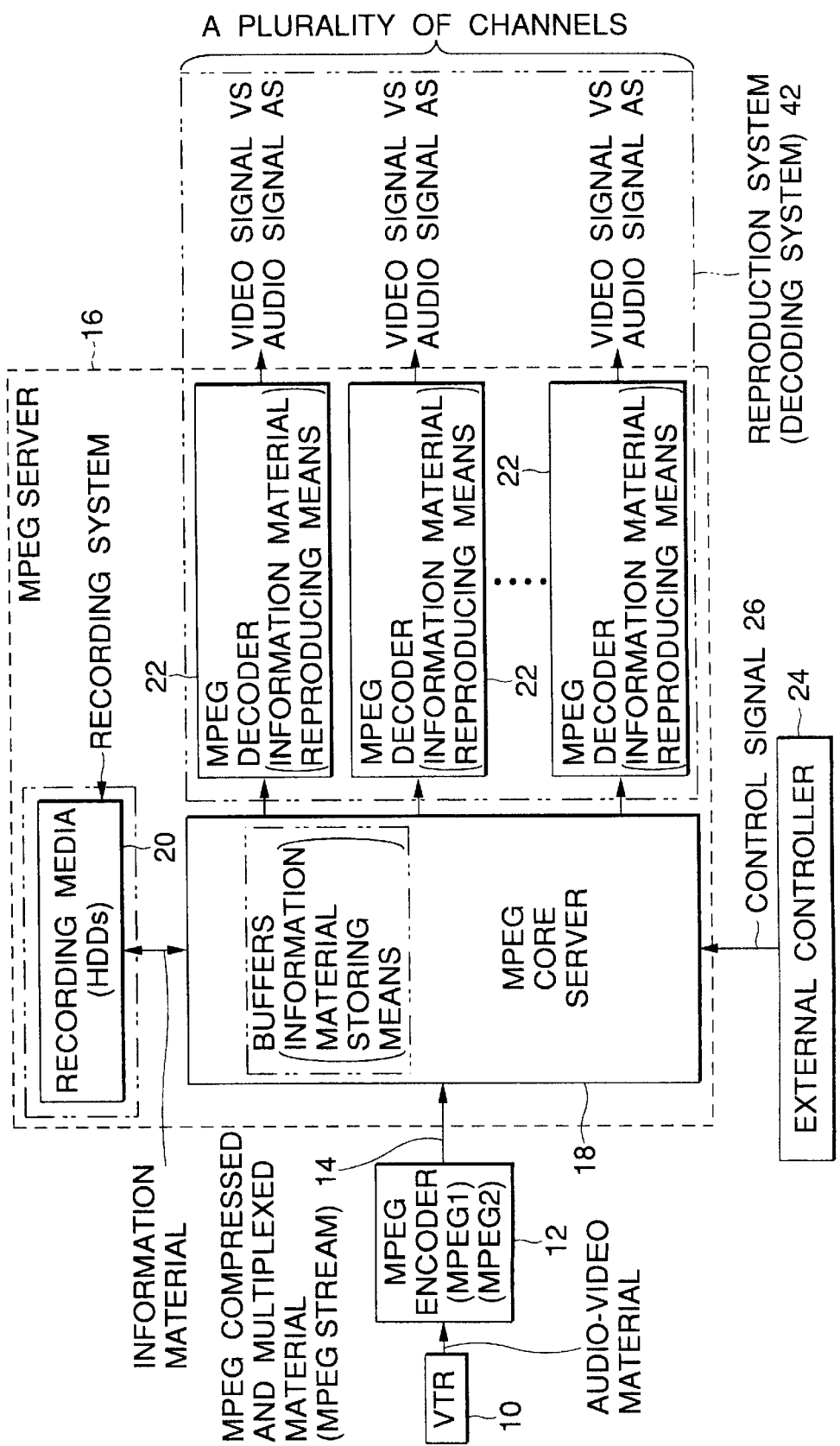
FIG. 1 shows a preferred entire configuration of an information reproduction apparatus according to the invention.
Figure 2:
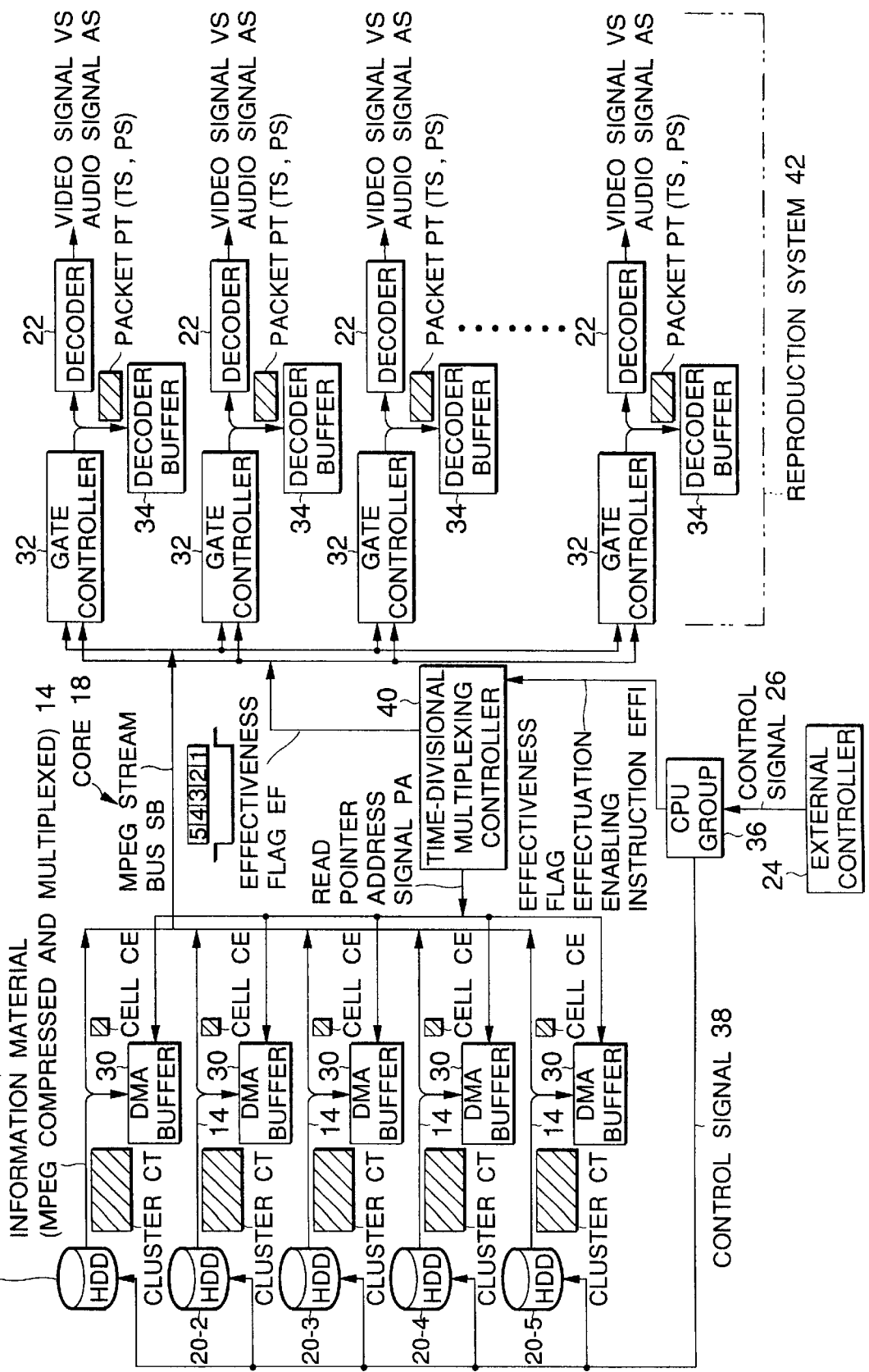
FIG. 2 shows the internal configuration of an MPEG server shown in FIG. 1 and an external controller.

FIG. 1 shows the entire configuration of an information reproduction apparatus according to a preferred embodiment of the invention, and FIG. 2 shows the internal configuration of an MPEG server of the information reproduction apparatus of FIG. 1.

Referring to FIG. 1, the information reproduction apparatus compression-codes an audio-video material sent from, for instance, a video tape recorder (VTR) 10 and reproduces (decodes) the coded material with an MPEG server. The video tape recorder 10 is connected to an MPEG encoder 12 which is a compression-coding device. The MPEG encoder codes a video material according to the MPEG2 scheme and codes an audio material according to the MPEG1 scheme or the like. The coded compressed materials are input to a core 18 of the MPEG server 16 as an MPEG compressed and multiplexed material (hereinafter called information material) according to the MPEG2 system scheme. The information material 14 is also called an MPEG stream.

The MPEG1 scheme, as well as the MPEG2 scheme, is an international standard that has been established by the joint organization of ISO (International Organization for Standardization) and IEC (International Electrotechnical Commission).

Next, the internal configuration of the MPEG server shown in FIG. 1 will be described.

The MPEG server 16 has the above-mentioned MPEG server core (hereinafter abbreviated as a core) 18, a plurality of hard disk drives 20 as a recording system (recording media), and MPEG decoders 22 as a plurality of information material reproducing means. The core 18 is connected to the plurality of hard disk drives 20 and the plurality of decoders 22. The core 18 is connected to an external controller 24, whereby a control signal 26 is supplied to the core 18.

The detailed configuration of the MPEG server 16 will be described below with reference to FIG. 2. The core 18 of the MPEG server 16 shown in FIG. 1 records information material (MPEG compressed and multiplexed material) 14 onto the hard disk drives 20 in accordance with the control signal 26 supplied from the external controller 24. Further, the core 18 supplies a desired material that is recorded on a hard disc drive 20 to a desired MPEG decoder (hereinafter abbreviated as a decoder) 22 in accordance with a control signal 38 supplied from a CPU group 36 that operates in accordance with the control signal 26 supplied from the external controller 24. Supplied with the information material, the decoder 22 decodes (reproduces) it and outputs a video signal VS and an audio signal AS to the outside.

In FIG. 2, the hard disk drives 20 as the recording media has five drives 20-1 to 20-5, each of which is connected to an MPEG stream bus SB via a DMA buffer 30. The stream bus SB is connected to the decoders 22 as the information material reproducing means via gate controllers 32 and decoder buffers 34, respectively.

The hard disk drives 20-1 to 20-5 are supplied with the control signal 38 from the CPU group 36. The hard disks of the hard disk drives 20-1 to 20-5 shown in FIG. 2 are recording media for recording information material 14 as described above. Each DMA buffer (also called a buffer memory) 30 is a buffer memory for temporarily storing information material 14 that is read out from the corresponding one of the hard disk drives 20-1 to 20-5. The decoder buffers (also called buffer memories) 34 are memories for temporarily storing information material that are read out from the DMA buffers 30.

The gate controllers 32 are controllers for controlling the writing of information material 14 to the respective decoder buffers 34. The decoders 22 decode (reproduce) information material 14 read out from the respective decoder buffers 34. A time-division multiplexing controller 40 is a controller for controlling the timing of reading out information material 14 from the DMA buffers 30. The CPU group 36 are central processing units for controlling the time-divisional multiplexing controller 40 and the access to the hard disk drives 20-1 to 20-5 by outputting the control signal 38 in response to a request (control signal 26) from the external controller 24 as a host controller. The CPU group 36 consists of a plurality of CPUs, which can communicate with each other by using a shared memory.

Having, for instance, the gate controllers 32, the decoder buffers 34, and the decoders 22, the reproduction system (decoding system) 42 shown in FIGS. 1 and 2 can reproduce information material 14 in the form of, for instance, video signals VS and audio signals AS on a plurality of channels corresponding to the number of decoders 22. To reproduce information material 14 on many channels, it is necessary to increase the ability of supplying the information material 14 from the plurality of hard disk drives 20-1 to 20-5. To this end, the plurality of (five in the example of FIG. 2) hard disk drives 20-1 to 20-5 are used in parallel.

Figure 9:
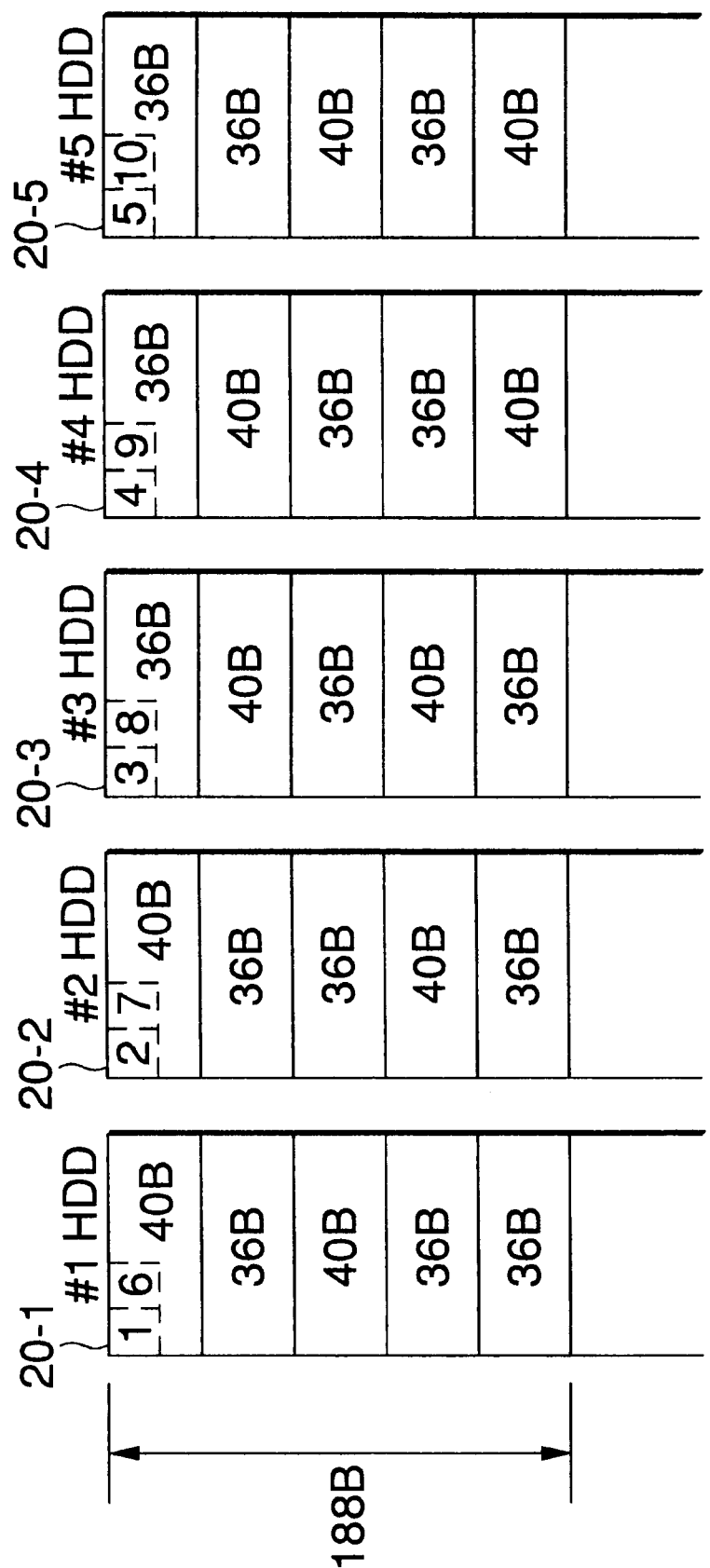
FIG. 9 shows an example of hard disk drives.
Figure 10:
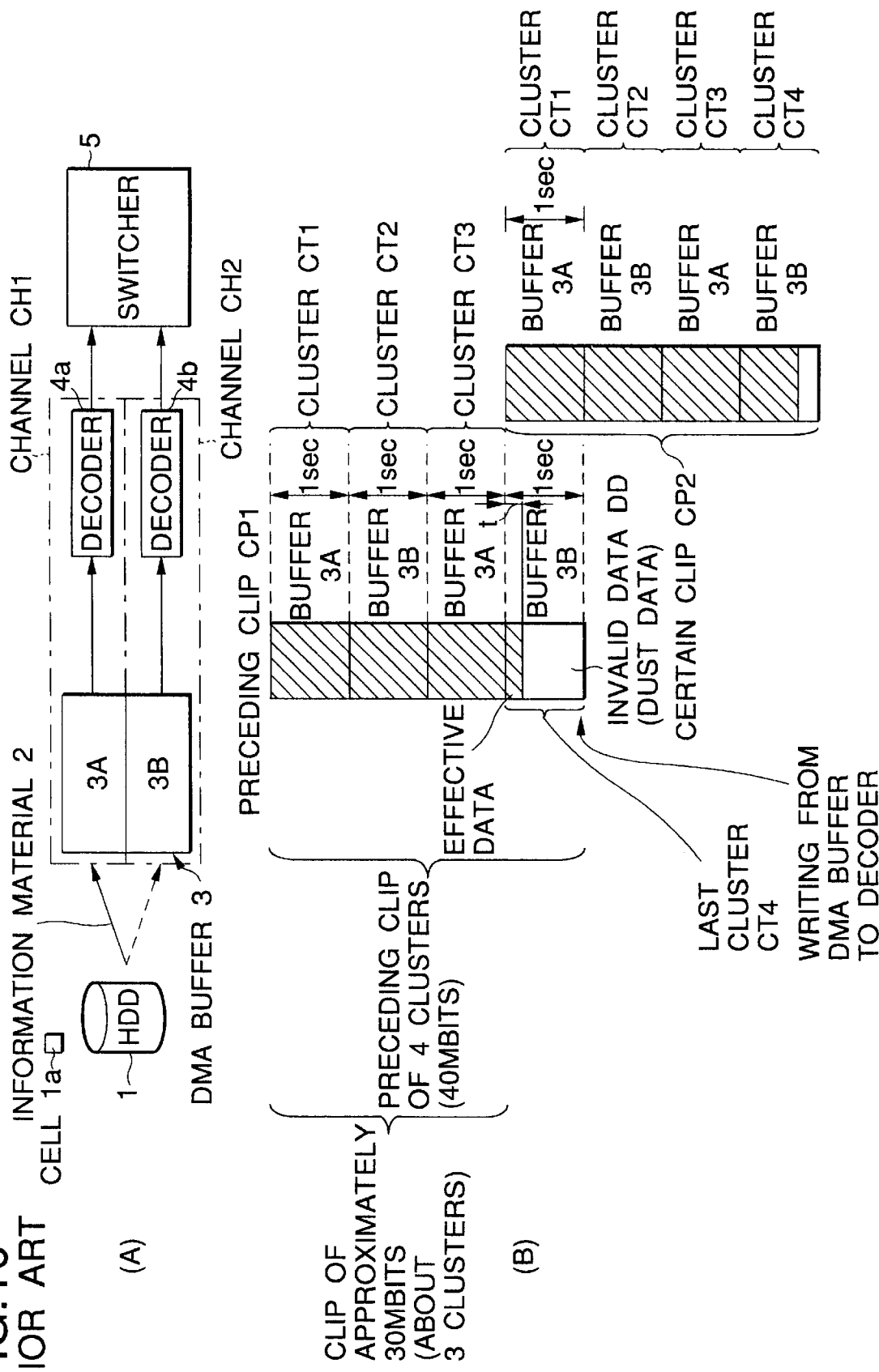
FIG. 10 shows a conventional example of connection between a hard disk, a DMA buffer, and decoders as well as example data of a certain clip and the preceding clip.

Information material 14 are supplied from the BPEG encoder 12 so as to be divided into certain units (for instance, 4 bytes), hereinafter called cells CE, and recorded onto the hard disks of the hard disk drives 20-1 to 20-5 shown in FIG. 2. FIG. 9 shows an example of the hard disks of the hard disk drives 20-1 to 20-5. Recording proceeds in such a manner that the head 4-byte cell is recorded onto the first hard disk drive 20-1 and the next 4-byte cell is recorded on the second hard disk drive 20-2.

However, the hard disks of the hard disk drives 20-1 to 20-5 can only be accessed in units (i.e., clusters CT shown in FIG. 2) of integral multiples of the unit generally called the sector (for example, 512 bytes). To absorb the difference between the information sizes of the cell CE and the cluster CT, the DMA buffers 30 are used as shown in FIG. 2. That is, in accessing the hard disk drives, information material 14 is temporarily stored in the DMA buffers 30.

Now, the terms will be described below briefly. The term "sector ST" means a "physical" minimum accessible unit of a recording medium such as a hard disk or a floppy disk. It consists of an ID section (address information or the like), a data section, an error correcting code, etc. In general, the sector size means the size of only the data section, which is usually 512 bytes.

The term "cluster CT" means a unit that is an integral multiple of the sector and is a "logical" minimum accessible unit of a recording medium such as a hard disk or a floppy disk. Therefore, each cluster consists of consecutively arranged sectors. The number of sectors that constitute one cluster depends on the kind of recording medium, its size, and other factors. For example, in the case of a floppy disk, one or two sectors usually constitute one cluster. In the case of a hard disk one cluster is constituted of one of various numbers of sectors such as 4, 8, and 16 sectors. As the number of sectors constituting one cluster decreases, the total number of clusters constituting one recording medium increases and hence the number of places of an address necessary to specify a cluster increases. Therefore, in general, a recording medium of a larger size has a larger number of sectors constituting one cluster. In general, the cluster size is represented by the data section size of sectors constituting a cluster multiplied by the number of sectors.

Further, the term "packet PT" indicates a unit that can be handled by a decoder and means a minimum unit of components used in multiplexing, according to the MPEG system standard, video data and audio data that have been coded (compressed) according to the MPEG standard. The packet PT is a minimum unit of components of an information material 14 when it is sent from a decoder buffer 34 to the associated decoder 22 (see FIG. 2). In other words, compressed video data and audio data are each divided into units called packets and then multiplexed at a proper ratio (for example, one audio packet per 10 video packets). In general, the packet size means the total size including not only the size of a data section (called a payload) but also the size of control codes. According to the MPEG system standard, the packet size is arbitrary in the case of a program stream intended for use mainly in storage media and is 188 bytes in the case of a transport stream intended for use mainly in communication or broadcasting media.

The time-divisional multiplexing controller 40 shown in FIG. 2 supplies a read pointer address signal PA and an effectiveness flag EF to the DMA buffers 30 and the gate controllers 32, respectively. The reason for the effectiveness flag EF is as follows. The main function of the time-divisional multiplexing controller 40 is to control reading of information material from the DMA buffers 30 so as to cause a desired information material 14 to flow through the MPEG stream bus SB at a desired time point. One-cell CE (4 bytes) of information material (MPEG stream) 14 that has been read out from the respective DMA buffers 30 is stored in the decoder buffers 34 in such a manner that data of a number equal to the number (5) of parallel hard disk drives 20-1 to 20-5 (4 bytes×5) is made as one set. The information material 14 stored in the decoder buffers 34 is processed and reproduced by the respective decoders 22 in due course.

At this time, because of the time-divisional multiplexing by the time-divisional multiplexing controller 40, certain data always flows through the MPEG stream bus SB. That is, data of information material 14 would undesirably flow toward even a gate controller 32 corresponding to a channel not relating to the current reproduction at a time point allocated to the channel.

In view of the above, to cause only effective information material 14 (i.e., information material that is desired to be decoded) to be captured by the corresponding decoder buffers 34, the time-divisional multiplexing controller 40 supplies effectiveness flags EF to the corresponding gate controllers 32. As a result, information material 14 flowing at a certain time point is effective with respect to the corresponding gate controller 32 (i.e. can be decoded) only when the effective flag EF is set (at the low level), and the gate controller 32 allows the corresponding decoder buffer 34 to capture the information material 14. The generation of the effective flag EF is another important role of the time-divisional multiplexing controller 40.

Figure 3:
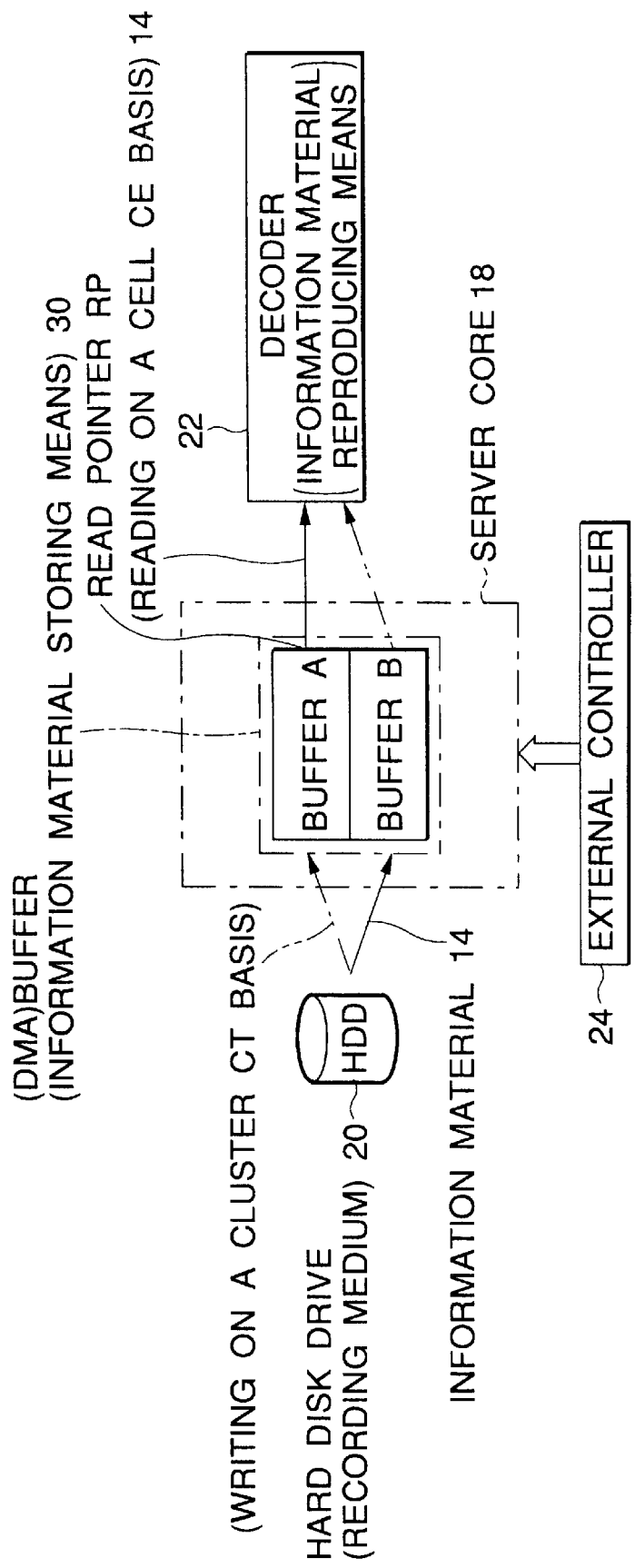
FIG. 3 shows an example of a connection relationship between a recording medium, a DMA buffer, and a decoder.

Next, an exemplary configuration of the DMA buffer 30 will be described with reference to FIGS. 2 and 3. FIG. 3 shows an exemplary connection between the DMA buffer 30 (serving as information material storing means), the hard disk drive 20 (one of 20-1 to 20-5) as a recording medium, and the MPEG decoder 22 (serving as an information material reproducing means).

Information material 14 can be written from the hard disk drive 20 to the DMA buffer 30 on a cluster CT basis. On the other hand, information material 14 can be read out from the DMA buffer 30 and supplied to the decoder 22 on a cell CE basis. The DMA buffer 30 has two ring-buffer-type buffers A and B. Basically, the buffers A and B are used as ring buffers. That is, while information material 14 is read out from one buffer (say, buffer A) and supplied to the decoder 22, information material 14 is written from the hard disk drive 20 to the other buffer (say, buffer B). When the reading of the information material 14 from buffer A has been finished, the information material 14 is then read out from buffer B and this time information material 14 is written from the hard disk drive 20 to buffer A.

The above operation is thereafter repeated in a similar manner, whereby information material 14 can be sent sequentially from the hard disk drive 20 to the decoder 22. Data of information material 14 is transferred from the hard disk drive 20 to the DMA buffer 30 in a burst-like manner on a cluster CT basis, and it is transferred from the DMA buffer 30 to the decoder 22 constantly on a cell CE basis.

If writing to buffer B has not been finished before reading from buffer A is completed, there occurs a possibility that invalid data (what is called dust data) DD is read out. It is necessary to prevent such an event. To this end, with the assumption that the minimum time taken to consume (read from the DMA buffer) 1 cluster of data of information material 14 is, say, one second, it is necessary to enable data of information material 14 to be read out from the hard disk drive 20 and supplied to the DMA buffer 30 once per second.

Therefore, in actual designing, the number of parallel hard disk drives 20, the maximum number of channels to be supported, and other parameters are determined so as to satisfy the above condition. In the embodiments of the invention, it is assumed that the parameters are set so as to satisfy the above condition.

Figure 8:
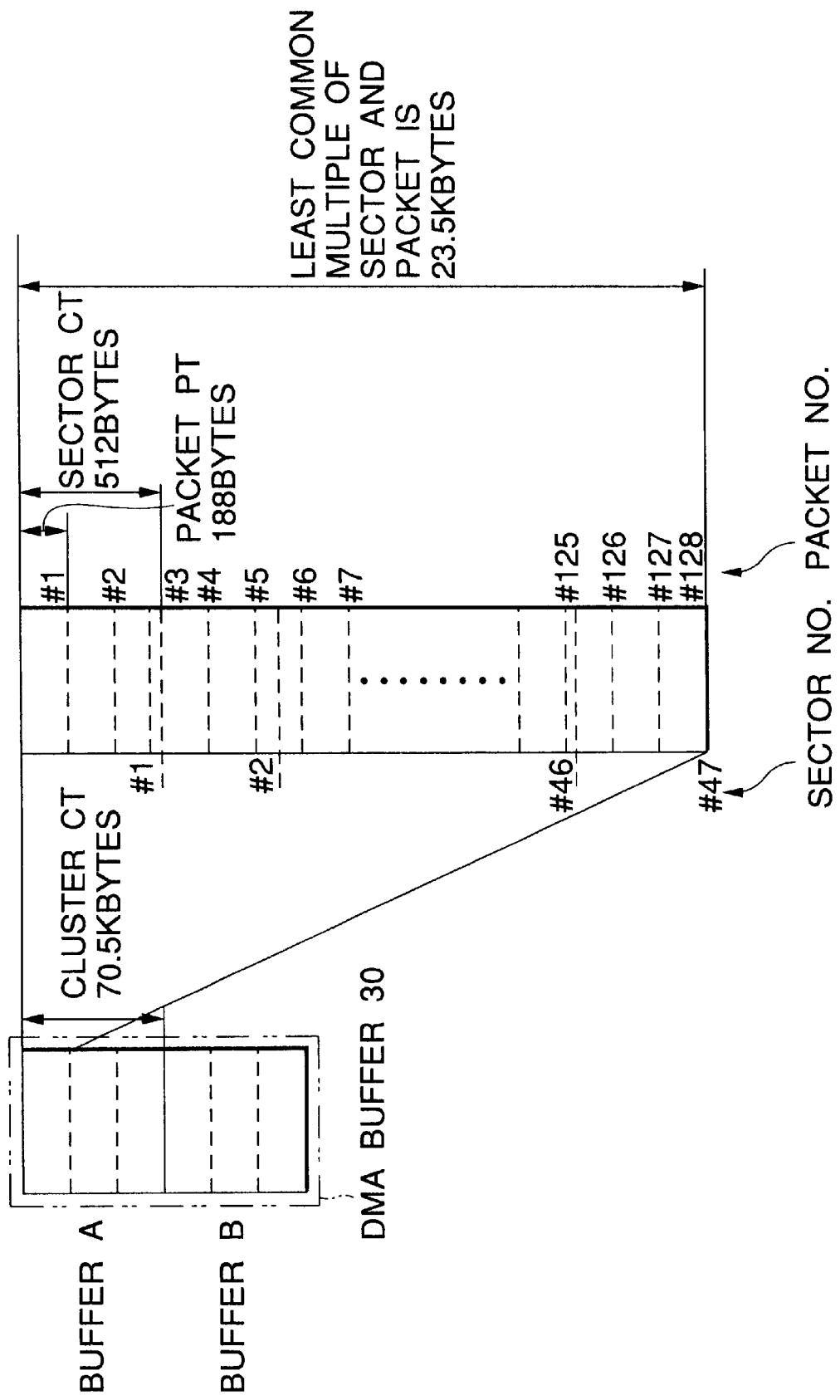
FIG. 8 shows an example of the relationship among the sector, the packet, and the cluster.

FIG. 8 shows an exemplary relationship among the cluster CT, the packet PT and the sector CT. Referring to FIG. 8, for example, if it is assumed that one sector is 512 bytes and one packet amounts to 188 bytes, the least common multiple of the sector and the packet is 128 packets:

cluster=24064 bytes=(512×188÷4)
=23.5 Kbytes
=47 sectors
=128 packets

If it is assumed that one cluster is three times the least common multiple, one cluster amounts to (3×128=) 384 packets:

cluster=70.5 Kbytes
=141 sectors
=384 packets.

DMA buffer 30 access sequence (non-consecutive reproduction scheme)

Before describing an information reproduction method according to the invention with reference to FIGS. 7 and 8, an access sequence, focused on the DMA buffer 30, relating to a clip information reproduction method (non-consecutive reproduction method) so far used ordinarily will be described as a basis with reference to FIG. 4. Here, a description will be made of an example structure of a certain clip CP2 and the preceding clip CP1. The preceding clip CP1 has four clusters CT1–CT4, each having a data width of about one second, for instance. However, at least part of the fourth cluster CT4 is invalid data DD. Similarly, the (next) clip CP2 has four clusters CT1–CT4.

Figure 4:
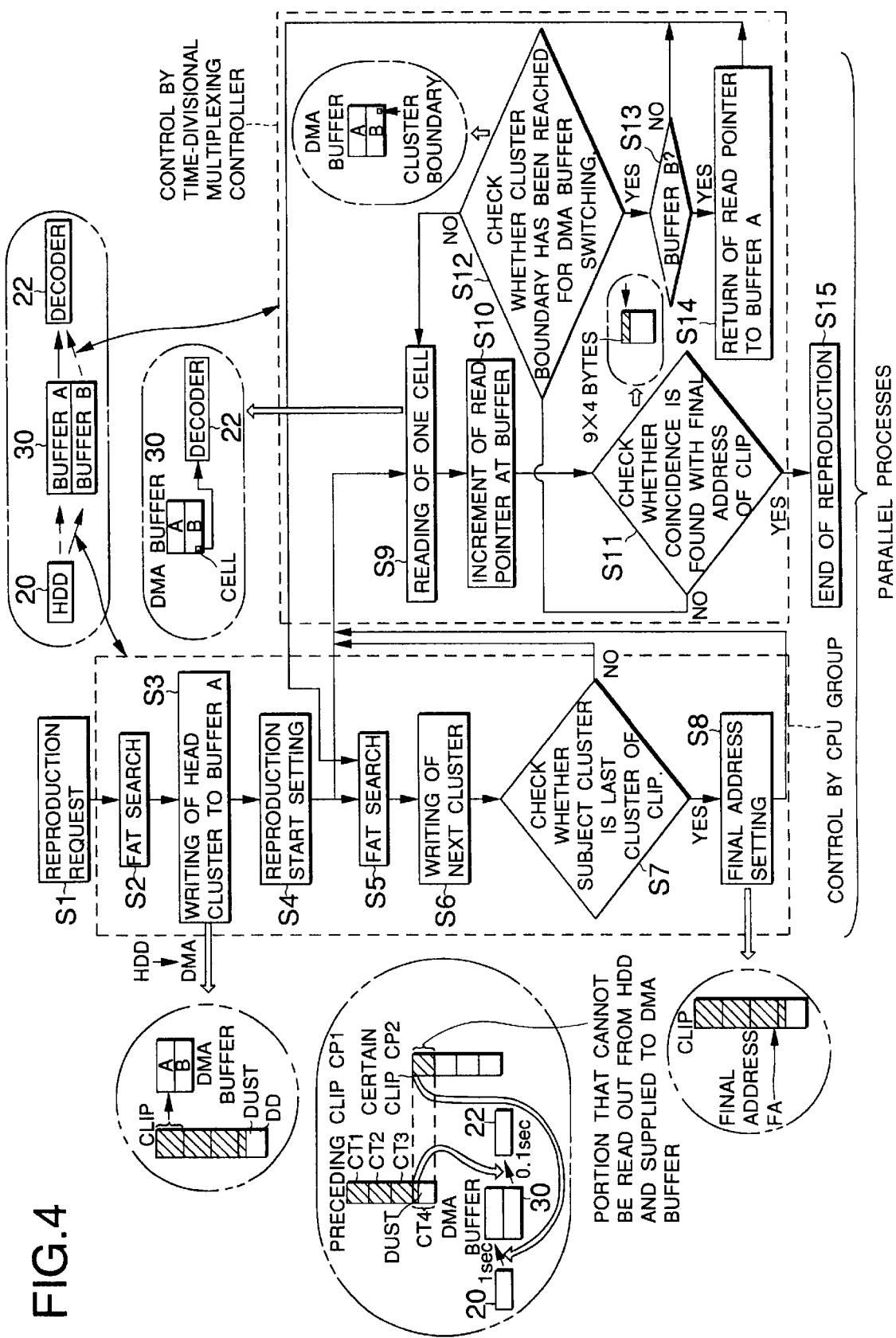
FIG. 4 shows a DMA buffer access sequence (clips non-consecutive reproduction scheme) as a comparative example for description of an information reproduction method according to the invention.

FIG. 4 shows a DMA buffer 30 access sequence used in a case (non-consecutive reproduction) where a certain clip CP2 and the preceding clip CP1 are not reproduced consecutively:

Step S1: A request (control signal 26) for reproducing a certain clip on a certain channel of the reproduction system 42 (see FIG. 2) is issued from the external controller 24 (see FIG. 1) as a host controller to the CPU group 36.

The following steps S2–S8 are to be executed by the CPU group 36 after reception of the reproduction request from the external controller 24. The following steps S9–S15 are to be executed by the time-divisional multiplexing controller 40.

Step S2: The address of the head cluster of a specified clip is checked by searching a FAT (file allocation table). The FAT is a kind of database for managing recording locations (addresses), on a HDD, of respective clusters as components of each clip.

Step S3: Data of the head cluster CT1 of the preceding clip CP1 (see FIG. 3) is written from the HDD 20 to the DMA buffer 30.

Step S4: The CPU group 36 sets the time-divisional multiplexing controller 40 so that reproduction is started on a specified channel.

Step S9: Data of one cell CE is read out from the DMA buffer 30 (see FIG. 3) at an address indicated by a read pointer RP.

Step S10: The read pointer RP is incremented.

Step S11: It is checked whether the read pointer RP coincides with a final address FA (i.e., an address before invalid data DD of the preceding clip CP1).

Step S12: If the read pointer RP does not coincide with the final address FA at step S11, it is checked whether the read pointer RP has reached a cluster boundary. If the read pointer RP has not reached a cluster boundary yet, the process returns to step S9.

Step S13: If the read pointer RP has reached a cluster boundary at step S12, it is checked whether the cluster boundary is a cluster boundary of buffer B. If it is not a cluster boundary of buffer B, the time-divisional multiplexing controller 40 informs the CPU group 36 that the read pointer RP has reached a cluster boundary and the process returns to step S5.

Step S14: If the cluster boundary is a cluster boundary of buffer B at step S13, the read pointer RP is returned to the head of buffer A. The time-divisional multiplexing controller 40 informs the CPU group 36 that the read pointer RP has reached a cluster boundary and the process returns to step S5.

If informed by the time-divisional multiplexing controller 40 at steps S13 or S14 that the read pointer RP has reached a cluster boundary, the CPU group 36 again executes step S5 onward. The read pointer RP is a pointer that indicates a location (address) of the DMA buffer 30 at which reading is performed.

Step S15: If the read pointer RP coincides with the final address, the reproduction is finished.

Step S5: The address of the next cluster of the specified clip is checked by searching the FAT.

Step S6: Data of the next cluster is written from the HDD 20 to the DMA buffer 30.

Step S7: It is checked whether this cluster is the last cluster CT4 of the specified clip (preceding clip) CP1. If it is not, the process returns to step S5.

Step S8: If, at step S7, the last cluster CT4 is detected, a final address FA is set and the process returns to step S5. Since the size of each clip is not necessarily equal to an integral multiple of the cluster size, the last cluster CT4 may have invalid data DD (dust data) after a certain address, which is called "final address FA." Values of the final addresses FA of the respective clips are managed by the CPU group 36 as a database in the same manner as the FAT.

The above-described processes of the CPU group 36 and the time-divisional multiplexing controller 40 are parallel ones.

The above-described DMA buffer 30 access sequence shown in FIG. 4 is what is called a non-consecutive reproduction scheme in which the preceding clip CP1 and CP2 are processed on a clip-by-clip basis.

Next, the packets that are the minimum process units of the MPEG decoder (information material reproducing means) 22 will be described with reference to FIGS. 5 and 6.

Figure 5:
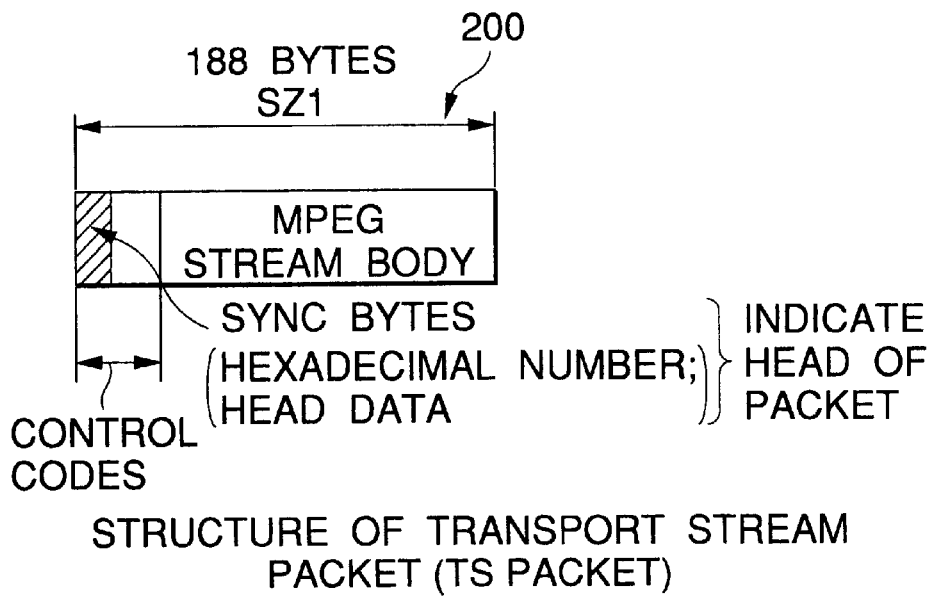
FIG. 5 shows the structure of a transport stream packet.
Figure 6:
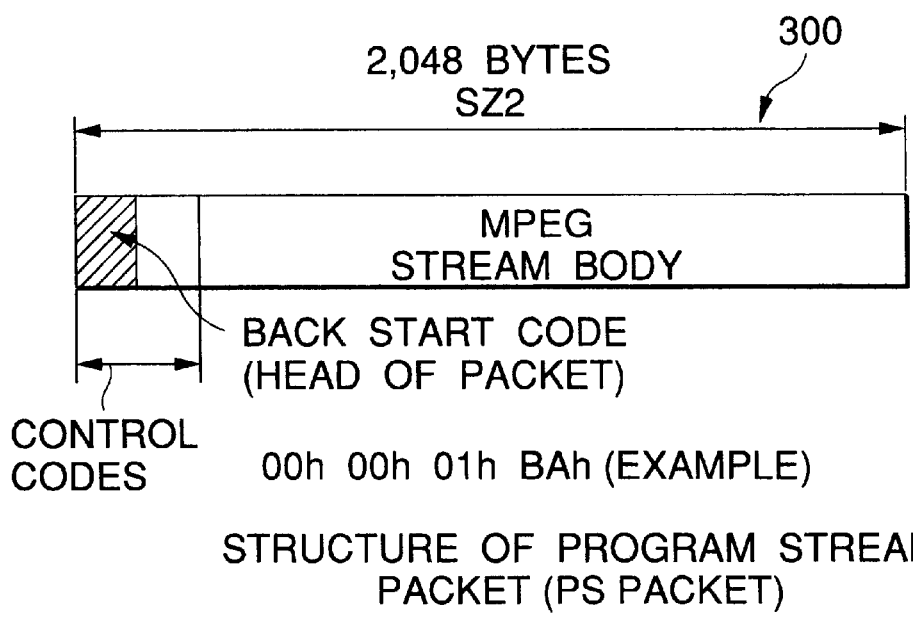
FIG. 6 shows the structure of a program stream packet.

FIG. 5 shows the structure of a transport stream packet and FIG. 6 shows the structure of a program stream packet. The transport stream packet (TS packet) 200 and the program stream packet (PS packet) 300 have packet structures according to the MPEG2 system standard. The transport stream packet 200 has a data size of, for instance, 188 bytes and includes control codes and a stream body. The control codes include sync bytes. The program stream packet 300 has a data size of, for instance, 2,048 bytes and includes control codes and a stream body. The control codes include a back start code.

The packets 200 and 300 are obtained by blocking coded data on a certain unit basis according to the MPEG2 system standard and are the minimum process units of the decoder 22 as the information material reproducing means (see FIG. 2). The sizes of the packets 200 and 300 are denoted by SZ1 and SZ2, respectively. As described above, the size SZ1 of the packet 200 is determined to be 188 bytes, and its front portion having a certain size is control codes and the remaining portion is an MPEG stream body. The head data called sync bytes is a particular code indicating that it is the head of the packet. Its hexadecimal value is determined to be 47h.

On the other hand, the size SZ2 of the packet 300 is arbitrary, for instance, 2,048 bytes, and its front portion having a certain size is control codes and the remaining portion is an MPEG stream body. The head four bytes called a back start code is a particular code indicating the fact that it is the head of the packet as well as the kind of packet. Its hexadecimal value is determined to be 00h 00h 01h BAh, for example.

FIGS. 7(A)–7(D) show examples of the size of the already described cluster (recording medium access unit), the size of the sector (recording medium minimum accessible unit), the above-described transport stream packet 200 and the program stream packet 300, respectively. The packets 200 and 300 will later be described herein as alternative minimum process units of the information material reproducing means.

The cluster CT, which is the unit used in accessing a recording medium such as a hard disk as described above ("logical" minimum accessible unit), consists of a plurality of sectors ST. FIG. 7(A) shows the size SZ3 of the cluster CT, which corresponds to the size of a plurality of, for instance six, sectors each having a size SZ4.

According to an embodiment of the invention, the size SZ3 of the cluster CT (the recording medium access unit) is advantageously set at a common multiple (for instance, the least common multiple) of the size SZ4 of the sector ST (the recording medium minimum accessible unit) and either the size SZ1 of the transport stream packet 200 or the size SZ2 of the program stream packet 300, depending upon which of the packets 200 or 300 serves as a minimum process unit in the information material reproducing means.

The reason that the embodiment of the invention chooses to have the size SZ3 of the cluster CT (recording medium access unit) set at a common multiple of the size SZ4 of the sector ST (recording medium minimum accessible unit) and either the size SZ1 of the transport stream packet 200 or the size SZ2 of the program stream packet 300 has to do with specialized searching operations, e.g. fast forward and fast reverse. As described above in connection with FIG. 4, in ordinary continuous reproduction of each clip of information material 14, a FAT is referred to each time clusters are handled in order from the head cluster. On the other hand, if it is possible to access an arbitrary cluster freely, a user can perform special reproducing operations such as fast forward and fast reverse. For example, fast forward is attained by directly accessing a cluster downstream of the current cluster by a certain number. Searching is performed by accessing clusters while skipping a certain number of clusters each time.

If no limitation is imposed on the cluster size and the packet size as in the conventional case in starting reproduction from an arbitrary cluster in the above manner, the head of a cluster does not necessarily coincide with the head of a packet and hence the reproduction of a cluster may start from a halfway position of an MPEG stream. Since a coded MPEG stream can have arbitrary values, those values may include a code that happens to be identical to the start code, for instance. In such case, the decoder erroneously recognizes this code as the start code, and hence the data cannot be reproduced correctly.

Figure 7:
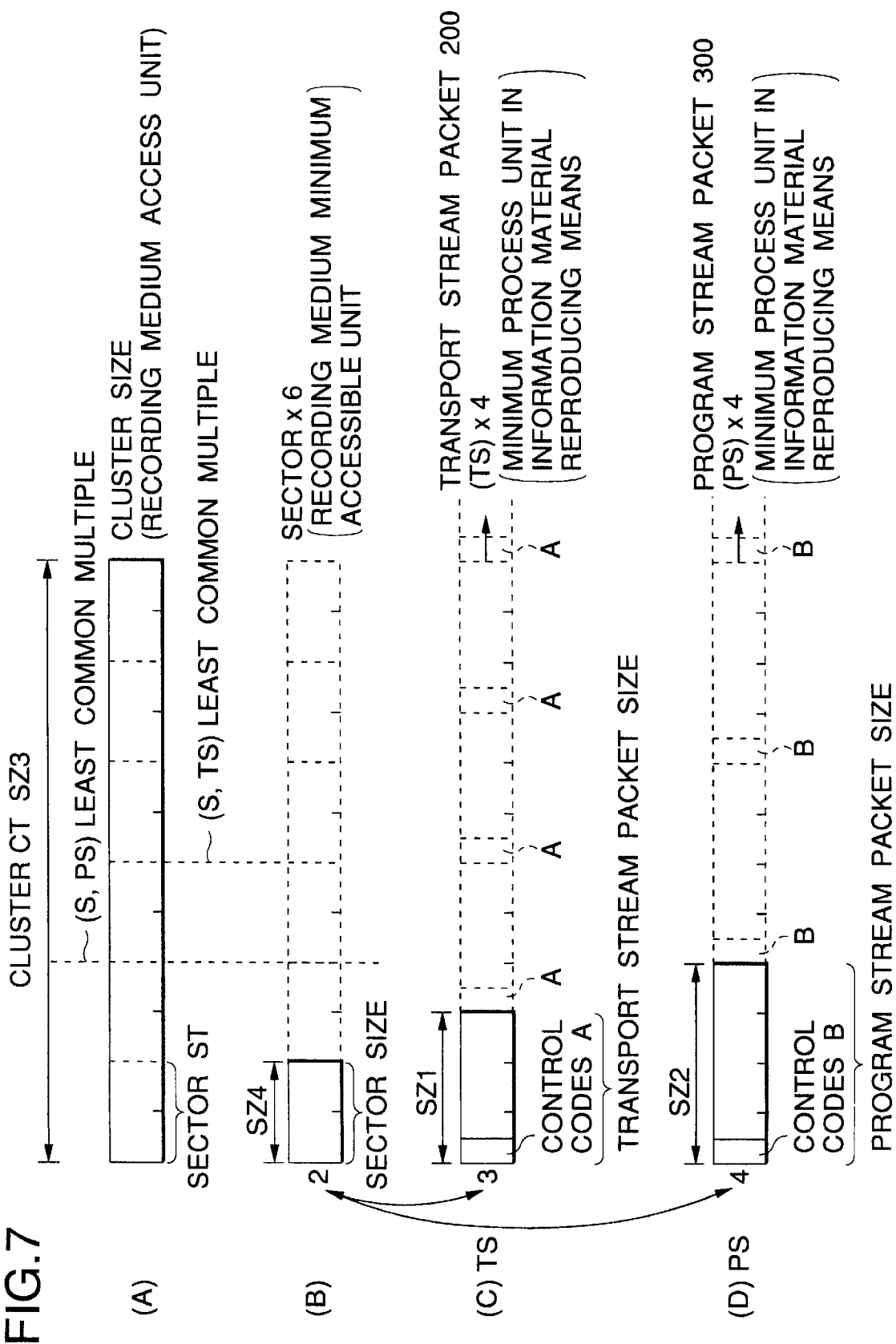
FIG. 7 compares the cluster size, the sector size, the transport stream packet size, and the program stream packet size.

In view of the above, in the embodiment of the invention, as described above, the size SZ3 of the cluster CT is set at a common multiple of the size SZ4 of the sector ST which is the hard disk drive minimum accessible unit and the size SZ1 of the transport stream packet 200 or the size SZ2 of the program stream packet 300 as shown in FIG. 7. As a result, it becomes possible to cause an arbitrary number of (for instance, six) clusters to necessarily start from the head of a packet. With this measure, even if fast forward or search is performed from the head of an MPEG stream body of data, the reproduction can be performed reliably without causing erroneous recognition by the decoder 22.

As the size of the cluster is larger, the data supply ability per unit time of the hard disk drive is higher. However, as the size of the cluster is larger, the necessary size of the DMA buffer 30 increases and the amount of invalid data (dust data) in the last cluster increases, resulting in a reduction in the efficiency of utilization of the hard disks. Therefore, in actual designing, a proper common multiple should be determined in accordance with the intended purpose.

For example, the information reproduction apparatus of the invention can be used for providing movies in hotels etc. according to the VOD (video on demand) scheme, providing explanatory video programs in museums etc., and providing language learning video programs in schools (LL classes and the like), etc. A user (viewer) can freely re-view a desired portion or view a downstream portion by skipping the intermediate portion. A system using the MPEG server of the embodiment of the invention is advantageous over a system using VTRs in accessing the same information material simultaneously from a plurality of places. Further, because of the simple configuration, it is advantageous in cost over a system that strictly manages time codes. In conventional VTRs, it is necessary to prepare magnetic tapes in a number corresponding to the maximum number of simultaneous accesses.

Incidentally, the invention is not limited to the above embodiments. Although the above embodiments use a hard disk drive as the recording medium, the invention is not limited to such a case: an optical disc, a magneto-optical disc, and other recording media may be used.

As described above, according to the invention, special reproducing operations such as fast forward and fast reverse can be performed on an audio-video material in a precise manner.

Although the present invention has been shown and described with respect to preferred embodiments, various changes and modifications are deemed to lie within the spirit and scope of the invention as claimed.

What is claimed is:

1. An information reproduction apparatus for reading out and reproducing information material having a plurality of clips, comprising:

recording media on which the information material is recorded in minimum accessible units;

information material storing means, including temporary buffer means, for reading out from the recording media, upon request and in sequence, a first clip and a second clip of the information material that each consist of a plurality of recording media access units, and writing the readout clips to the temporary buffer means;

information material reproducing means for reproducing in process units the first clip from the temporary buffer means at the same time that the second clip is being written in the temporary buffer means by the information material storing means; and wherein a size of the recording media access unit is set at a common multiple of a size of the recording media minimum accessible unit and a size of a minimum process unit in the information material reproducing means.

2. The information reproducing apparatus according to claim 1, wherein the information material of the recording media is audio-video information that has been compression-coded, and the information material reproducing means decodes the information material.

3. The information reproducing apparatus according to claim 1, wherein the recording media are magnetic disks, and wherein the size of the recording media minimum accessible unit is a sector size and the minimum process unit in the information material reproducing means is a packet size.

4. The information reproducing apparatus according to claim 3, wherein the recording media access unit is a cluster size.

5. The information reproducing apparatus according to claim 3, wherein the minimum process unit in the information material reproducing means is a transport stream packet size.

6. The information reproducing apparatus according to claim 5, wherein the transport stream packet size is 188 bytes.

7. The information reproducing apparatus according to claim 3, wherein the minimum process unit in the information material reproducing means is a program stream packet size.

8. The information reproducing apparatus according to claim 7, wherein the program stream packet size is 2,048 bytes.

9. An information reproduction method for reading out and reproducing information material having a plurality of clips, comprising the steps of:

recording the information material on recording media in minimum accessible units;

reading out from the recording media, upon request and in sequence, a first clip and a second clip of the information material that each consist of a plurality of recording media access units, and writing the readout clips to a temporary buffer memory;

reproducing, in process units, the first clip from the temporary buffer memory at the same time that the second clip is being written in the temporary buffer memory; and wherein in the reading out step, a size of the recording media access unit is set at a common multiple of a size of the recording media minimum accessible unit and a size of a minimum process unit.

10. The information reproducing method according to claim 9, wherein the step of recording the information material on the recording media comprises recording audio-video information that has been compression-coded, and the reproducing step decodes the information material.

11. The information reproducing method according to claim 9, wherein the recording media are magnetic disks, and wherein the size of the recording media minimum accessible unit is a sector size and the minimum process unit in the reproducing step is a packet size.

12. The information reproducing method according to claim 11, wherein the recording media access unit is a cluster size.

13. The information reproducing method according to claim 11, wherein the minimum process unit in the reproducing step is a transport stream packet size.

14. The information reproducing method according to claim 13, wherein the transport stream packet size is 188 bytes.

15. The information reproducing method according to claim 11, wherein the minimum process unit in the reproducing step is a program stream packet size.

16. The information reproducing method according to claim 15, wherein the program stream packet size is 2,048 bytes.

* * * * *